J. W. EMERSON.
PROCESS OF TREATING ORES.
APPLICATION FILED FEB. 19, 1914.
1,126,965.
Patented Feb. 2, 1915.
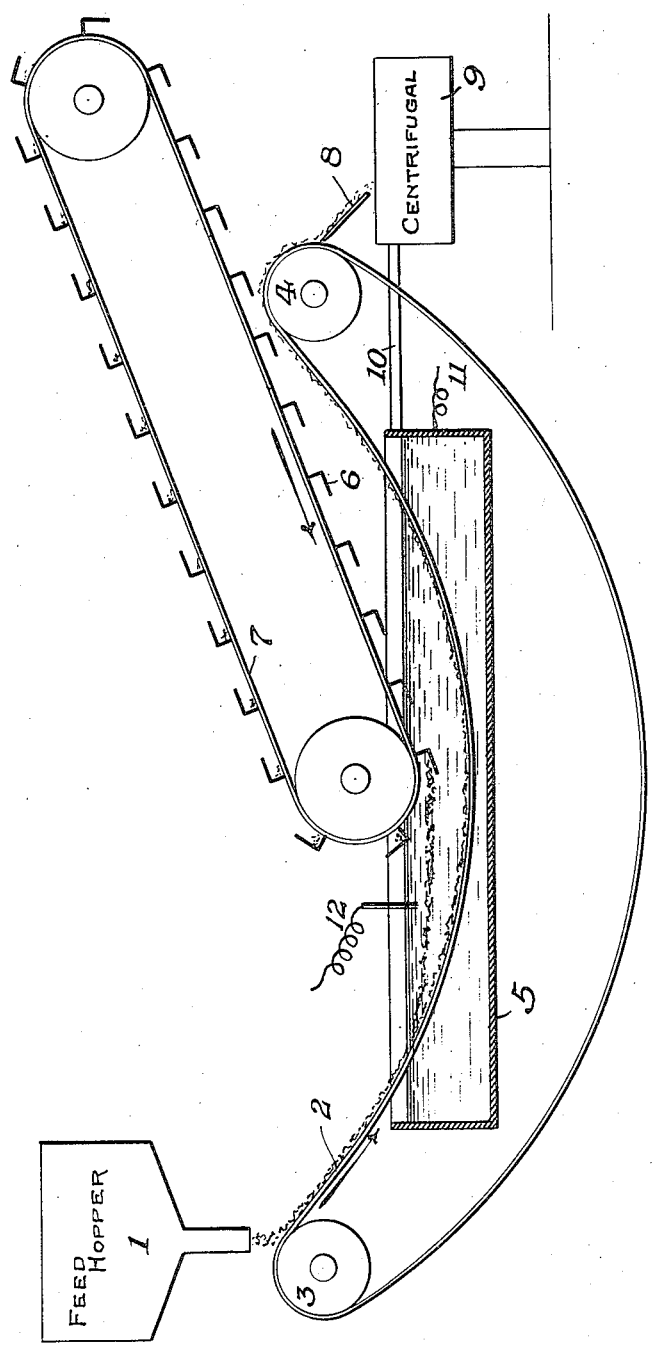
Attest:
Annie Cooper
Paul Finckel
Inventor
Joseph W. Emerson,
By
Attorney.

UNITED STATES PATENT OFFICE.

JOSEPH W. EMERSON, OF SALIDA, COLORADO.

PROCESS OF TREATING ORES.

1,126,965.  Specification of Letters Patent.  Patented Feb. 2, 1915.

Application filed February 19, 1914. Serial No. 819,768.

*To all whom it may concern:*

Be it known that I, JOSEPH W. EMERSON, a citizen of the United States, residing at Salida, in the county of Chaffee and State of Colorado, have invented new and useful Improvements in Processes of Treating Ores, of which the following is a specification.

This invention relates to processes of treating ores; and it comprises a method of separating zinc blende from heavy concentrates containing the same wherein a layer or body of said concentrates is submerged beneath the surface of a body of an aqueous liquid under circumstances permitting a slight gas-generating attack of said liquid, or of components of the same, upon the blende without material attack upon other components of said concentrates, the amount of the attack upon the blende being merely such as will cause the blende particles to rise in such liquid above the general plane of such layer or body, and wherein the attacked buoyed blende particles are at once separated from residual heavier particles and from further action of such liquid; all as more fully hereinafter set forth and as claimed.

In the treatment of ores containing zinc blende by the ordinary methods of ore concentration, considerable difficulty is experienced in obtaining a clean separation of the blende from the pyrites, quartz, etc., on the ordinary types of shaking tables and the like. The specific gravity of blende is not very far different from that of pyrites and the two do not separate well. It has been proposed to treat concentrates containing particles of blende, pyrites and the like in an acid bath in such manner as to cause an attack of the blende particles with liberation of gas sufficient to cause a flotation of the blende particles; to cause the blende particles to rise to the surface of the bath whence they can be floated away. Such processes however have not been of practical utility since attacking blende to an extent sufficient to cause it to float causes a relatively great loss of acid and of zinc. The evolution of sulfureted hydrogen means the solution of a corresponding amount of zinc, and a neutralization of a corresponding amount of acid. The dissolved zinc and the neutralized acid are substantially worthless. Furthermore, and particularly in the case of nitric acid, any strength of acid which will cause an attack of zinc blende sufficient to float it usually attacks pyrites or other components of the concentrates to an extent sufficient to cause some flotation of these minerals also, thereby giving an impure product. For the stated reasons, these flotation methods have not gone into use to any substantial extent. I have discovered however that it is not necessary to use such a far going attack upon the blende particles and that a much slighter action may be usefully employed. I have found that by submerging concentrates containing blende in a relatively slow acting acid liquid the first result of the attack is to cause the blende particles to rise a little above the general plane of the layer of concentrates in which they are contained; this being particularly the case when the layer, as is advantageously the case, is a traveling layer, one in which there is more or less agitation of the particles. Under these conditions, the blende particles rise above the general plane of the layer and there is also a peculiar action taking place in that the separating blende particles tend to clump together into aggregates or bodies which are readily mechanically removed. Ordinarily, I allow the action to take place to such an extent that there is merely a slight clearance, say half an inch or so, between the rising blende particles and the body of other minerals below. At this time I remove the clumped zinc, ordinarily by means of a conveyer or collecting mechanism of any suitable type, from contact with the acid liquid, and I also remove the residual heavy minerals from such contact. The acid removed with the blende and with the heavy minerals is allowed to drain back to the bath. Under these conditions there is a very slight, and negligible, attack of the acid on the zinc blende; with a similarly negligible waste of acid and of zinc. Nor are the other minerals of the concentrates affected. The attack of acids and the like upon zinc blende is preferential to their attack on most of the other materials likely to occur in heavy concentrates and by operating under the described conditions there is practically no action upon other materials while the action upon the blende is, as stated, negligible.

In the described operation the period of contact of the concentrates with the acid bath and the strength and temperature of such bath are, in a way, reciprocal factors.

The weaker or the colder the acid the longer must be the contact before the described rising of the blende occurs, and vice versa. I therefore correlate the period of exposure of the blende to the acid bath with the strength and temperature of such acid bath in such a manner as to produce the described rising. I do not produce any general flotation for the reasons stated ante.

Any suitable type of apparatus may be employed in performing the described process; but it is advantageous to convey the concentrates to be separated on a belt or the like into, to, through and out of the acid bath. If desired, the conveyer may enter the liquid as a catenary curve. At the lowest point of the travel of the belt there should be a substantial thickness of liquid above the layer of granular material. The use of a belt has the advantage that the particles of concentrates traveling on and with it are more or less agitated which facilitates the rising of the blende particles. Operation may be in an ordinary open tank; and it is usually not particularly advantageous to perform the operation in a closed tank. In a closed tank the atmospheric pressure above the liquid and material traveling through it may be somewhat reduced which will allow the rising of the blende particles with an even smaller consumption of acid and of zinc. Operation may be at the ordinary temperatures. If the liquid is hot the strength of acid must be much reduced. With a hot liquid however the development of water vapor coöperates with the development of sulfureted hydrogen in producing the rising effect; i. e., a somewhat weaker acid may be employed and the waste of acid and of zinc thereby made even smaller. However operation at the ordinary temperature gives very good results.

The concentrates may come from any of the ordinary shaking tables or other devices but should be as free as possible of calcite and other light minerals. The concentrates are best so fine grained that the particles of zinc blende are substantially free of gangue. Very many strengths of acid may be employed; it being always remembered that the stronger the acid or the higher its temperature the less is the period of contact with the concentrates required to produce the differential rising of the blende. As stated, it is desired to make the blende only rise while leaving the other materials as a heavy layer. With strong acid or a long contact there will always be more or less rising of pyrites. Any strength of acid or time of contact sufficient to cause an actual flotation of the blende particles will not only result in loss of acid and of zinc but also in the production of an impure product containing pyrites. With a proper control of conditions, the separation of blende from pyrites and quartz is clean and perfect; the blende particles being free of pyrites and quartz. With the proper amount of rising in the bath the blende particles clump together in a curious manner; a manner resembling that of electrified particles in some other relations. These clumps may be very easily removed from the solution by mechanical means such as a bucket conveyer dipping in the bath and extending to a point just above the conveyer carrying the concentrates. Using a scoop of this type it is advantageous to allow the blende to rise so as to produce an inch or half an inch clearance; to rise that distance above the general plane of the layer of material on the belt conveyer. In operating at ordinary temperatures I have found a bath of sulfuric acid containing about 10 per cent. of acid to work well. Hydrochloric or nitric acid of similar strength may also be used. A useful bath is produced by dissolving bleaching powder (chlorid of lime) in a cold dilute solution of nitric acid; about 10 pounds of bleaching powder in 20 gallons of 10 per cent. nitric acid. Ii the bath be heated to 80 or 90 C., these strengths may be much reduced. It is not necessary to use free acid since the same results can be obtained by generating a little acid, or gas developing chemical, in the solution itself. For example, the bath may be a solution of salt, sulfate of soda, etc., and an electric current, either alternating or direct, passed through the liquid from suitable insoluble electrodes; such as carbon pole pieces. Under the action of the current acid or chlorin is developed in the liquid and these will give a preferential attack on the blende particles sufficient to produce the described rising. The use of the electric current for this purpose has the advantage that it enables a further control of conditions in the bath. Using preformed acid, control must be effected by regulating the time of contact alone; as by quickening or slowing down a belt passing through the bath and carrying the concentrates. With the electric current, control can be equally well afforded by varying the strength of the current.

In the accompanying illustration I have shown, more or less diagrammatically in vertical section, one of the many embodiments of apparatus elements which may be used in the performance of the described process. In this showing, element 1 is a hopper or the like acting as a source of concentrates. The concentrates fall upon belt conveyer 2 looped over pulleys 3 and 4 and extending in a depending curve beneath the surface of an acid bath contained in tank 5. The length of this belt and the degree of curvature should be as to allow a layer of concentrates to form and remain on its surface during its period of travel. In passing through the acid bath in this tank the blende is slowly acted on and tends to rise to form clumps which are scooped out by buckets 6 on belt 7 and removed. The adhering acid drains back into the bath. The blende is delivered by the scoops into a suitable place of storage or the like (not shown). It may be here washed or simply dried, this depending upon the particular acid used. The separated pyrites, quartz, etc., on the belt conveyer are removed by scraper 8 and may be dumped into centrifugal 9 where the adhering liquid is removed and sent back to the bath through conduit 10. The separated pyrites may be washed and the washing reconcentrated and added to the bath, if so desired. Where the electric current is employed, the tank or other vessel (5) employed may be of steel or other metal and connected to source of current 11, a carbon rod or the like 12 acting as the other electrode.

What I claim is:

1. The process of separating blende from blende-containing concentrates which comprises submerging a layer of the concentrates in a substantial body of an acid solution for a brief period of time, the strength and character of the acid and the time of contact being so correlated as to cause development of merely enough gas on the blende particles to cause a lifting of such particles in such solution out of the general plane of the layer and a clumping together of such particles, and then engaging said particles before they reach the surface and immediately removing them from the acid solution.

2. The process of removing blende from blende-containing concentrates which comprises submerging a body of such concentrates in a relatively deep body of an acid solution, mechanically engaging said particles as soon as they rise above the general plane of such body of concentrates and immediately removing them from the acid solution.

3. The process of removing blende from blende-containing concentrates which comprises passing a shallow traveling layer of such concentrates into and through an aqueous bath under circumstances causing a preferential gas-evolving attack upon the blende to an extent only sufficient to lift the blende particles slightly above the surface of the layer in clumped aggregates and at once mechanically engaging and removing the lifted blende aggregates from the bath.

4. The process of removing blende from blende-containing concentrates which comprises passing a shallow traveling layer of such concentrates into and through an acid aqueous bath, the strength of acid being such as will cause an attack of the blende particles to an extent only sufficient to cause a lifting of the same as clumped aggregates just above such layer and at once mechanically engaging and removing the lifted blende aggregates from the bath.

In testimony whereof I have hereunto set my hand in presence of two subscribing witnesses.

JOSEPH W. EMERSON.

Witnesses:
E. B. EMERSON,
C. F. JOHNSON.